United States Patent [19]
Cook

[11] Patent Number: 5,386,316
[45] Date of Patent: Jan. 31, 1995

[54] OPTICAL SYSTEMS HAVING MULTIPLE SIMULTANEOUS FUNCTIONS

[75] Inventor: Lacy G. Cook, El Segundo, Calif.

[73] Assignee: Hughes Aircraft Company, Los Angeles, Calif.

[21] Appl. No.: 18,905

[22] Filed: Feb. 8, 1993

Related U.S. Application Data

[63] Continuation of Ser. No. 694,963, May 2, 1991, abandoned.

[51] Int. Cl.⁶ ............................................. G02B 17/00
[52] U.S. Cl. ..................................... 359/365; 359/730; 359/857; 359/861
[58] Field of Search ..................... 359/850, 857–861, 359/364–366, 726–731

[56] References Cited

U.S. PATENT DOCUMENTS

| | | | |
|---|---|---|---|
| 3,454,338 | 7/1969 | Girard et al. | 359/859 |
| 3,674,334 | 7/1972 | Offner | 359/366 |
| 4,101,195 | 7/1978 | Korsch | 359/366 |
| 4,632,521 | 12/1986 | Korch | 359/366 |
| 4,993,818 | 2/1991 | Cook | 359/366 |
| 5,009,494 | 4/1992 | Iossi et al. | 359/859 |
| 5,136,422 | 8/1992 | Ukon | 359/366 |

FOREIGN PATENT DOCUMENTS 0364154  4/1990  European Pat. Off. .

OTHER PUBLICATIONS

Optical Engineering, vol. 25, No. 9, Sep. 1986, Bellingham, U.S., pp. 1045–1054.
J. B. Odom et al.: Technology and the Hubble Space Telescope Satellite, pp. 175–176; FIGS. 2, 3.

*Primary Examiner*—Bruce Y. Arnold
*Assistant Examiner*—James Phan
*Attorney, Agent, or Firm*—M. W. Sales; W. K. Denson-Low

[57] ABSTRACT

An all-reflective optical system has a first (10) and second (12) reflecting assembly. The first reflecting assembly (10) includes an afocal three-mirror anastigmat (18, 20, 22) with one or more apertures (28 A–D) in the tertiary mirror (22) to enable light or energy to pass therethrough. Light or energy reflects from the second reflecting assembly (12) through the apertures (28 A–D) to provide simultaneous viewing of a scene by a plurality of instruments (34). The second reflecting assembly (12) includes a planar mirror which provides pointing and stabilization motions for all of the instruments simultaneously without degrading image quality or pupil registration.

9 Claims, 2 Drawing Sheets

OPTICAL SYSTEMS HAVING MULTIPLE SIMULTANEOUS FUNCTIONS

This is a continuation of application Ser. No. 07/694,963, filed May 02, 1991, now abandoned.

BACKGROUND OF THE INVENTION

1. Technical Field

This invention relates to reflective telescope systems and, more particularly, to an all-reflective optical system which provides energy from a viewed scene simultaneously to multiple scientific or strategic surveillance instruments.

2. Discussion

In both scientific observation and strategic surveillance activities, it is desirable to have an optical system which provides energy or light to separate instrument packages, which are utilized for specialized purposes by the system. Preferably, it is desirable to have the instrument packages located behind a common light gathering optical system or foreoptics. It is also desirable to provide energy or light from a viewed scene simultaneously to each of the packages. While it is generally not required in such applications that all instruments share precisely a common line of sight, it is desirable that all instruments point substantially in the same direction and that light from a point object of interest within the scene be rapidly and accurately pointed or steered to any or all of the instruments. Additionally, it is desirable that the mechanism for this pointing or steering function also provide the function of line of sight stabilization during the time that an instrument or instruments receive light from the scene.

In the past, the integration of several instruments behind a common telescope generally utilized an image forming two-mirror Cassegrain-like optical system as its foreoptics. The instrument packages interfaced with the aberrated image formed by the Cassegrain-like foreoptical system. Furthermore, these devices utilize the Cassegrain secondary mirror as a line of sight pointing and stabilization mirror even though the required tilt motions degraded the image quality of the optical system and caused excessive beam wander on certain optical elements. Further, these systems have many other disadvantages. Some of the disadvantages are the size and weight of the system, operational utility, and testing and integration of the separate instruments.

A number of afocal three-mirror anastigmat telescopes which have different magnifications have been designed and implemented in the past. An example of this type of system is illustrated in U.S. Pat. No. 3,674,334, issued Jul. 4, 1972 to Offner, entitled "Catoptric Anastigmatic Afocal Optical System."

SUMMARY OF THE INVENTION

According to the teachings of the present invention, a system is provided which utilizes an all-reflective afocal optical system to provide energy from a viewed scene simultaneously to several instruments. The present invention provides a foreoptical system which may be utilized as a general telescope to provide energy from a viewed scene simultaneously to several instruments. The configuration of the afocal three-mirror anastigmat utilizes the offset and annular nature of the telescope field of view, the afocal magnification, and the location of the exit pupil.

The telescope provides substantially large aperture and field of view capabilities. The present invention provides for correction of spherical aberration, coma, and anastigmatism and provides a flat field of view. Also, multiple scientific instruments such as infrared spectrometers, imaging photometers, infrared array cameras, and fine guidance sensors can simultaneously receive the energy from the afocal three-mirror anastigmat.

In the preferred embodiment, the all-reflective afocal optical system includes an entrance pupil region, a first reflective assembly and a second reflective assembly. The first reflective assembly includes an opening or aperture to enable passage of energy or light therethrough. The second reflective assembly is positioned at the exit pupil of the first reflecting assembly such that the energy or light reflected by the second reflecting assembly passes through the opening or aperture in the first reflective assembly and into the various instruments. The second reflective assembly provides the internal pointing and stabilization functions for all of the instruments simultaneously, and without degradation to either image quality or pupil alignment.

BRIEF DESCRIPTION OF THE DRAWINGS

The various advantages of the present invention will become apparent to those skilled in the art after study of the following specification and by reference to the drawings in which.

DESCRIPTION OF THE PREFERRED EMBODIMENT

Figure 1:
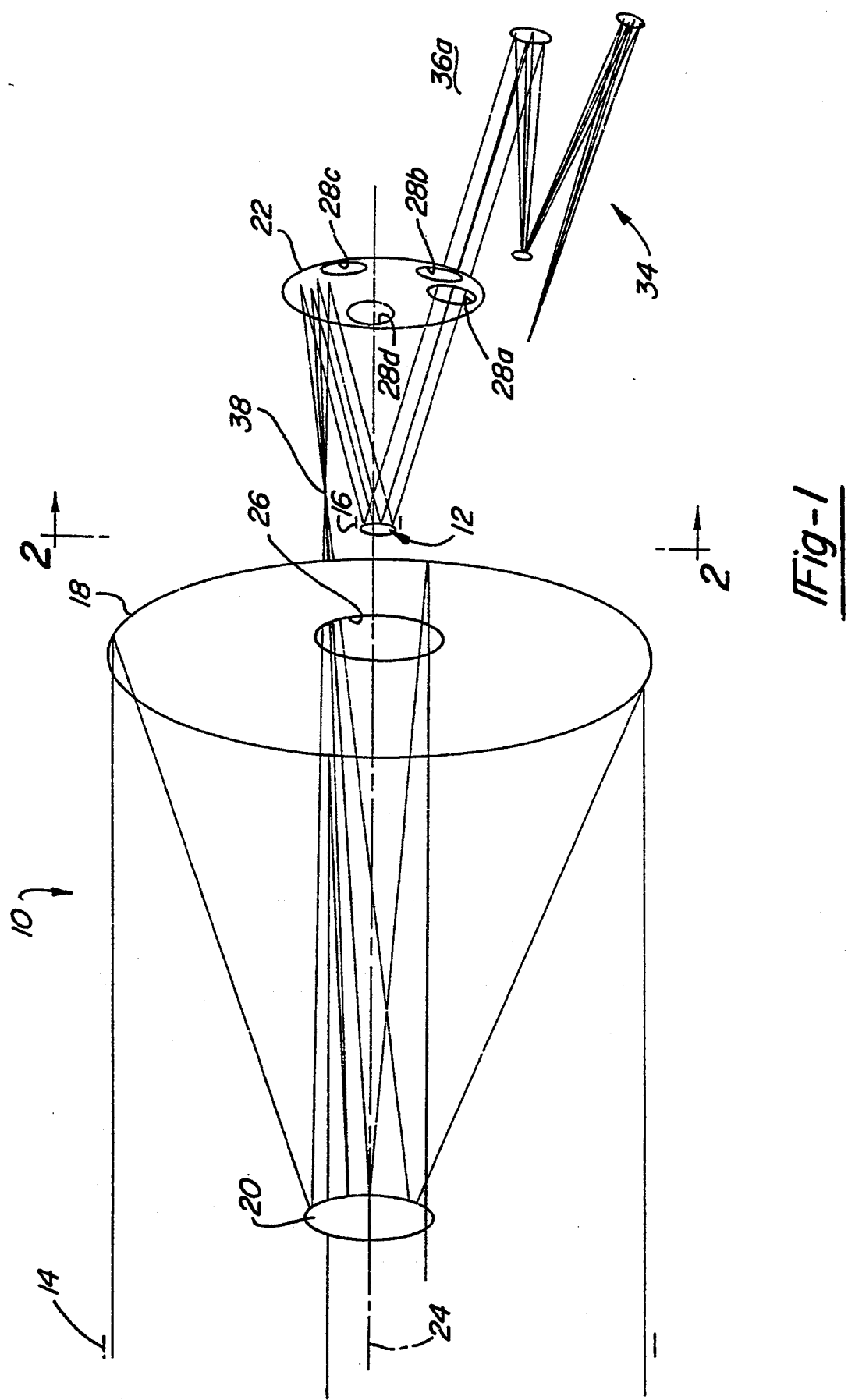
FIG. 1 is a schematic perspective view of an apparatus made in accordance with the teaching of the present invention. In this Figure, only one of the possible four instrument packages is illustrated.
Figure 2:
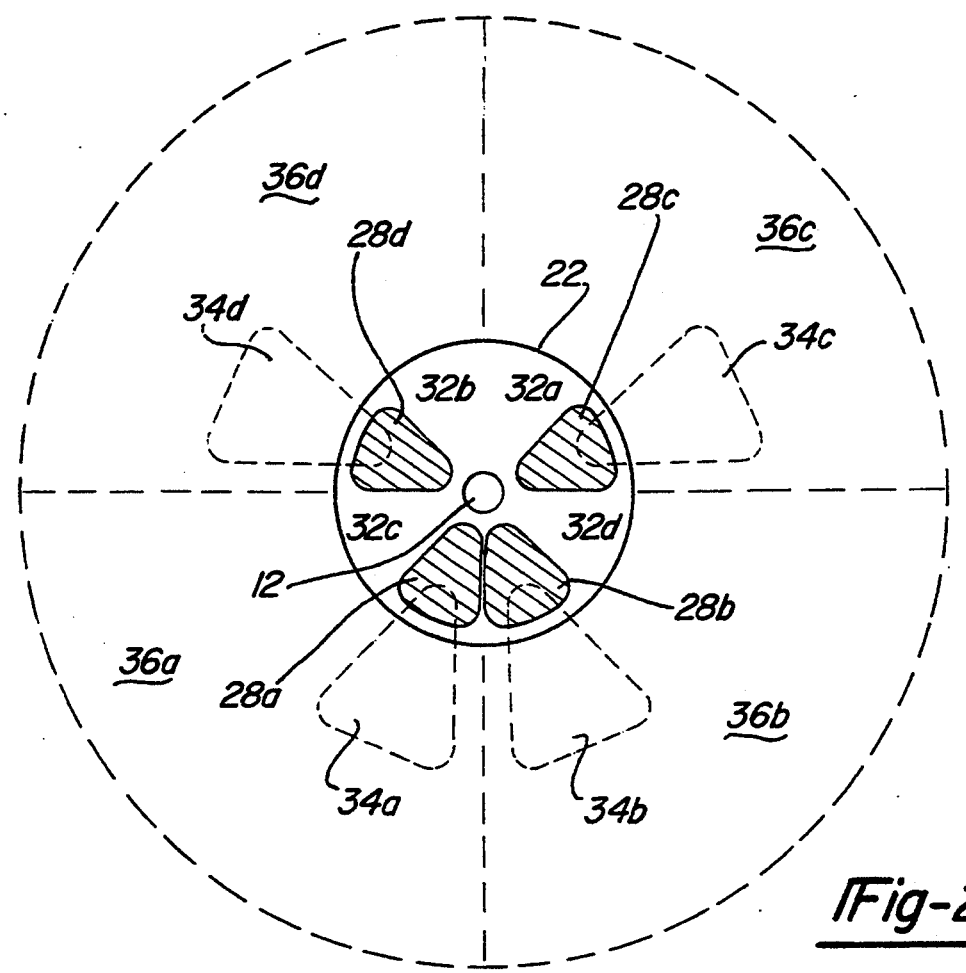
FIG. 2 is a schematic elevation view of FIG. 1 along line 2—2 thereof.

Referring to FIGS. 1 and 2, an afocal optical system is shown including a first 10 and second 12 reflecting assembly. The system also includes an entrance pupil region 14 and an exit pupil 16. The first reflecting assembly 10 is comprised of a primary 18, secondary 20, and tertiary 22 mirror. Likewise, the second reflecting assembly 12 is comprised of a planar or flat mirror.

The primary mirror 18 of the first reflecting assembly 10 includes a central axis 24 defining the system optical axis. The primary mirror 18 is fixably positioned on-axis with respect to the optical axis 24. The primary mirror 18 includes a central hole 26 to enable passage of light therethrough. The primary mirror 18 is a positive power mirror and may be a paraboloid conic or higher order aspheric mirror.

The secondary mirror 20 is a negative power mirror. The secondary mirror is fixably positioned on-axis with respect to the optical axis 24. The secondary mirror 20 is positioned in front of the primary mirror 18 such that light reflecting from the secondary mirror 20 passes through the primary mirror's hole 26 to the tertiary mirror 22. The secondary mirror 20 may be a hyperboloid conic or higher order aspheric mirror.

Figure 3:
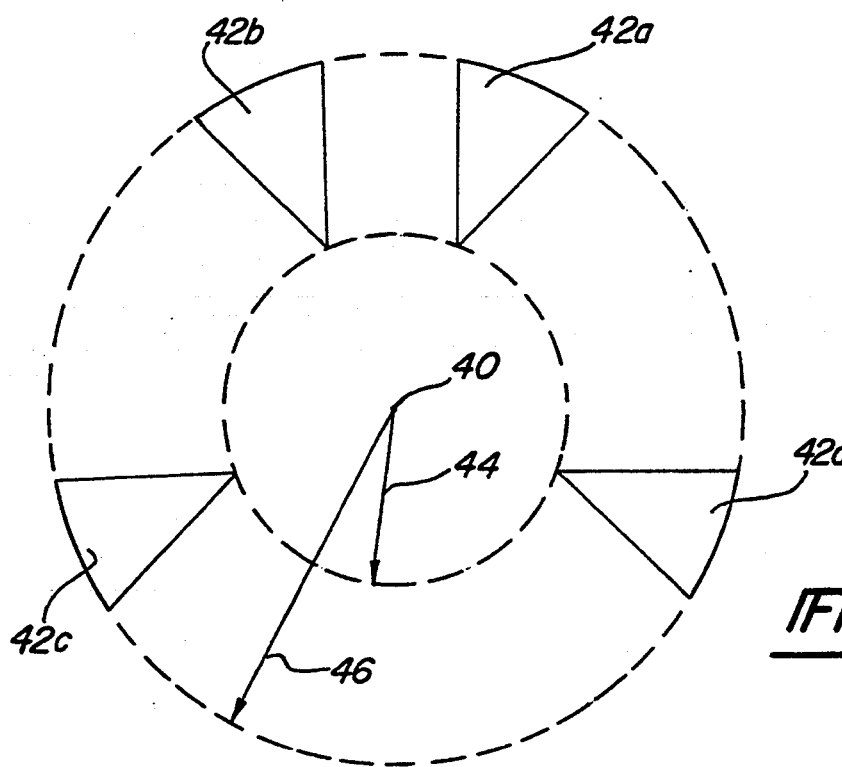
FIG. 3 is a schematic view of the apportionment of the optical system field of view to four separate instruments.

The tertiary mirror 22 is a positive power mirror. The tertiary mirror 22 is fixably positioned on-axis with respect to the optical axis 24. The tertiary mirror 22 may be an parabaloid conic or higher order aspheric mirror. Due to the rotational symmetry of the three mirrors which comprise the afocal telescope of the first reflective assembly, the field of view of this telescope exhibits annular symmetry. Furthermore, the field of view can be apportioned and utilized as shown in FIG. 3, where provisions are made for four separate instruments. The center of the telescope field 40 is centered on the telescope optical axis 24, but the four portions of the field 42(a–d) used by the four separate instruments are the triangular regions contained in the annulus defined by field angles 44 and 46. The angular field radius 44 may have a typical value of 20 to 30 arc minutes and the angular field radius 46 may be 50 to 60 arc minutes.

Referring again to FIGS. 1 and 2, the tertiary mirror 22 includes one or more openings or apertures 28(a–d). Preferably, the tertiary mirror includes four such apertures 28(a–d) positioned radially about the mirror 22. The apertures 28(a–d) are positioned such that they are diametrically opposite of the position where the reflected beam is passed from the second mirror assembly 12 as seen in FIG. 2 which will be explained herein.

The flat pointing and stabilization mirror 12 of the second reflecting assembly is positioned at the exit pupil 16 of the three-mirror anastigmat system 10. The stabilization mirror is a flat planar mirror and receives collimated light or energy from the tertiary mirror 22. The stabilization mirror 12 is positioned in front of the tertiary mirror 22 on-axis with respect to the optical axis 24 as seen in FIG. 1. The mirror 12 is tiltable on the optical axis 24.

As light is reflected from the tertiary mirror 22 to the stabilization mirror 12, the light or energy from the stabilization mirror 12 is reflected through the apertures 28(a–d) in the tertiary mirror 22. The stabilization mirror 12 is positioned such that the light reflecting from the tertiary mirror reflective portion 32(a–d) passes through its corresponding aperture 28(a–d) positioned diametrically opposing the reflecting portion 32(a–d) of the tertiary mirror as seen in FIG. 2.

The light that passes through the tertiary mirror 22 then passes into the regions 34(a–d) in the individual instrument volume spaces 36(a–d) behind the tertiary mirror 22. The instruments will be positioned at a desired position behind the apertures as illustrated in FIG. 1. As the light reflects from the tertiary mirror 22 to the stabilization mirror and back through apertures 28(a–d) the light energy is received by the instruments. The instruments receive the light or energy simultaneously from the viewed scene. Thus, the telescope would enable simultaneous operation on the reflected energy. Because the telescope has a flat field and has very low residual aberrations, and due to the reimaging characteristics of the telescope and the location of the pointing and stabilization mirror, the pointing and stabilization motions preserve both image quality and pupil alignment.

The optical path of the beam passing through the optical system is such that the light diverges from the intermediate image 38 formed by the primary and secondary mirror to the tertiary mirror 22. The light is recollimated by the reflection from the tertiary mirror 22. The light is next reflected from the tertiary mirror 22 to the stabilization mirror 12 which is located at the system exit pupil 16. The light reflects from the stabilization mirror and passes through a desired aperture 28 in the tertiary mirror 22. The energy passes into the instrument volume space 36 which is generally behind and outside the tertiary mirror 22.

Thus, with the pointing and stabilization mirror 12 at its nominal position and tilt, light from the field of view region 42a in FIG. 3 will be reflected from region 32a of the tertiary mirror as shown in FIG. 2. This light will then reflect from the pointing and stabilization mirror 12 and pass through the aperture 28a in the tertiary mirror and proceed into region 34a in the instrument volume 36a.

It is important to note that light from a scene contained within any one of the field of view regions 42(a–d) can be directed into any one of the instruments in regions 36(a–d) by a simple tilt motion of the pointing and stabilization mirror 12. Thus, light from field of view region 42a that strikes tertiary mirror region 32a can be directed using pointing mirror 12 into any of the opening or aperture regions 28(a–d) and into the corresponding instrument contained in volumes 36(a–d). This pointing or steering is accomplished without degradation to either image quality or pupil alignment.

A specific prescription for the system in accordance with the present invention as illustrated in FIGS. 1, 2 and 3 is as follows.

TABLE 1

Optical Prescription of a Specific Embodiment of the Optical System of the present invention.

| No. | Description | Radius | Conic Constant | Thickness | Material |
|---|---|---|---|---|---|
| 18 | Primary Mirror | −238.000 | −1.0010 | −97.2324 | Refl |
| 20 | Secondary Mirror | −52.8443 | −2.0489 | 157.3919 | Refl |
| 22 | Tertiary Mirror | −67.6732 | −0.97975 | −42.1352 | Refl |
| 12 | Point/Stab Mirror | ∞ | — | 100.000 | Refl |

(+) Distance are to the right along primary optical axis
(+) Radii have centers to the right
(+) Decenters are up
(+) Tilts are counterclockwise, degrees
CC Conic Constant = −(Eccentricity)$^2$
Thicknesses are between mirror vertices.
All dimensions are in inches unless specified otherwise.

The present invention has several advantages over the prior art foreoptical systems. The present invention uses an all-reflective afocal system which provides simultaneous functioning of several sensing devices. The present invention enables a small compact all-reflective system to be utilized as a common foreoptic assembly. The present invention minimizes the space requirement for the foreoptic system. Also, the present invention eliminates refractive elements and provides desired characteristics.

Additionally, the present invention allows for large angle pointing and stabilization motions without degradation to either image quality or pupil registration. While the prior art uses a Cassegrain-like foreoptics which dictates an aberrated and focal optical interface to the instruments, the present invention uses an afocal telescope with a collimated and aberration free optical interface. This collimated and aberration-free optical interface is less sensitive to misalignment between the instruments and the foreoptics, and greatly aids in the alignment, testing, and integration of the various instruments.

It should be understood that while this invention has been described in connection with the particular examples hereof, that various modifications, alterations and variations of the disclosed preferred embodiment can be made after having the benefit of the study of the specification, drawings and subjoined claims.

What is claimed is:

1. An all-reflective optical system comprising:
an entrance pupil region;
an afocal three-mirror anastigmat telescope including:
a primary mirror for reflecting light from a viewed scene passing through said entrance pupil;
a secondary mirror for reflecting light from said primary mirror; and
a tertiary mirror for reflecting light from said secondary mirror to an exit pupil, said tertiary mirror including a plurality of apertures for enabling passage of light therethrough; and
reflecting means for reflecting light from said tertiary mirror, said reflecting means positioned at said exit pupil such that the light reflected by said reflecting means passes through said apertures in said tertiary mirror to a plurality of regions for viewing.

2. The system according to claim 1 wherein a sensing means is positioned behind said tertiary mirror at said plurality of regions for viewing.

3. A foreoptical system comprising:
an entrance pupil region;
first reflective means for reflecting light from a viewed scene passing through said entrance pupil region to an exit pupil, said first reflecting means including a reflecting element having a plurality of apertures;
second reflecting means for reflecting light from said first reflecting means, said second reflecting means positioned at said exit pupil such that said second reflecting means reflects said light through said apertures to plurality of viewing regions to enable simultaneous viewing of the viewed scene by a plurality of sensing means.

4. The system according to claim 3 wherein said first reflecting means further includes an opening or an aperture means for enabling light to pass therethrough forming a first reflecting passage means.

5. The system according to claim 3 wherein said first reflecting means defines an axis and said second reflecting means is positioned on-axis.

6. The system according to claim 3 wherein said first reflecting means is an afocal three-mirror anastigmat telescope.

7. An all-reflective optical system comprising:
an entrance pupil region;
an afocal three-mirror anastigmat telescope including:
a primary mirror for reflecting light from a viewed scene passing through said entrance pupil wherein said primary mirror defines an optical axis;
a secondary mirror for reflecting light from said primary mirror; and
a tertiary mirror for reflecting light from said secondary mirror to an exit pupil, said tertiary mirror including a plurality of apertures for enabling passage of light therethrough;
wherein said primary, secondary and tertiary mirrors are positioned on-axis with respect to said optical axis; and
reflecting means for reflecting light from said tertiary mirror, said reflecting means positioned at said exit pupil such that the light reflected by said reflecting means passes through said apertures in said tertiary mirror to a plurality of regions for viewing wherein said reflecting means is positioned on-axis with respect to said optical axis and wherein said reflecting means is tiltable.

8. An all-reflective optical system comprising:
an entrance pupil region;
an afocal three-mirror anastigmat telescope including
a primary mirror for reflecting light from a viewed scene passing through said entrance pupil;
a secondary mirror for reflecting light from said primary mirror, and a tertiary mirror for reflecting light from said secondary mirror to an exit pupil;
said tertiary mirror including opening or aperture means for enabling passage of light therethrough; and
reflecting means for reflecting light from said tertiary mirror, said reflecting means positioned at said exit pupil such that the light reflected by said reflecting mean passes through said opening or aperture means in said tertiary mirror to a region for viewing wherein said opening or aperture means includes at least four apertures in said tertiary mirror.

9. An all-reflective optical system comprising:
an entrance pupil region;
an afocal three-mirror anastigmat telescope including:
a primary mirror for reflecting light from a viewed scene passing through said entrance pupil, said primary mirror defines an optical axis
a secondary mirror for reflecting light from said primary mirror; and
a tertiary mirror for reflecting light from said secondary mirror to an exit pupil, said tertiary mirror including a plurality of apertures for enabling passage of light therethrough;
wherein said primary, secondary and tertiary mirrors are positioned on-axis with respect to said optical axis, and said primary mirror includes a central hole for enabling light to pass from said secondary mirror to said tertiary mirror; and
reflecting means for reflecting light from said tertiary mirror, said reflecting means is tiltable and is a flat planar mirror, said reflecting means positioned at said exit pupil such that the light reflected by said reflecting means passes through said apertures in said tertiary mirror to a plurality of regions for viewing.

* * * * *